United States Patent
Wai et al.

(10) Patent No.: US 8,901,869 B2
(45) Date of Patent: Dec. 2, 2014

(54) HYBRID CLOSED LOOP SPEED CONTROL USING OPEN LOOK POSITION FOR ELECTRICAL MACHINES CONTROLS

(75) Inventors: Jackson Wai, Dunlap, IL (US); Jesse Gerdes, Dunlap, IL (US); James Michael Thorne, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 204 days.

(21) Appl. No.: 13/562,375

(22) Filed: Jul. 31, 2012

(65) Prior Publication Data

US 2014/0035505 A1    Feb. 6, 2014

(51) Int. Cl.
*H02P 1/04* (2006.01)
*H02P 3/00* (2006.01)

(52) U.S. Cl.
USPC ............ 318/461; 318/432; 318/561; 318/701

(58) Field of Classification Search
USPC .................. 318/432, 461, 561, 701, 689, 800
See application file for complete search history.

(56) References Cited

U.S. PATENT DOCUMENTS

| | | | | |
|---|---|---|---|---|
| 3,758,757 | A * | 9/1973 | Buhler et al. | 700/74 |
| 5,177,421 | A * | 1/1993 | Sasaki et al. | 318/571 |
| 5,210,478 | A * | 5/1993 | Sasaki et al. | 318/632 |
| 5,313,403 | A * | 5/1994 | Fujita et al. | 700/184 |
| 5,545,964 | A | 8/1996 | Stephenson et al. | |
| 5,637,969 | A * | 6/1997 | Kato et al. | 318/432 |
| 5,637,974 | A | 6/1997 | McCann | |
| 5,969,499 | A | 10/1999 | Shaffer | |
| 6,788,024 | B2 * | 9/2004 | Kaneko et al. | 318/807 |
| 6,822,417 | B2 * | 11/2004 | Kawaji et al. | 318/701 |
| 7,002,318 | B1 | 2/2006 | Schulz et al. | |
| 7,176,650 | B2 | 2/2007 | Mayes | |
| 7,193,387 | B1 * | 3/2007 | Lu et al. | 318/800 |
| 7,298,105 | B1 * | 11/2007 | Lu et al. | 318/432 |
| 7,388,345 | B2 | 6/2008 | McClelland | |
| 8,080,969 | B2 | 12/2011 | Koenig | |
| 8,125,175 | B2 * | 2/2012 | Yoneda et al. | 318/689 |
| 2002/0158606 | A1 * | 10/2002 | King | 320/125 |
| 2003/0006723 | A1 * | 1/2003 | Sul et al. | 318/127 |
| 2004/0051495 | A1 * | 3/2004 | Kaneko et al. | 318/807 |
| 2004/0090198 | A1 * | 5/2004 | Kaku et al. | 318/432 |
| 2004/0189226 | A1 * | 9/2004 | King | 318/375 |
| 2004/0201358 | A1 * | 10/2004 | Kawaji et al. | 318/701 |
| 2006/0012321 | A1 * | 1/2006 | Rozman et al. | 318/432 |
| 2007/0216337 | A1 * | 9/2007 | Lu et al. | 318/800 |
| 2009/0128081 | A1 * | 5/2009 | Yoneda et al. | 318/689 |
| 2010/0148753 | A1 * | 6/2010 | Ha et al. | 324/107 |
| 2010/0295495 | A1 * | 11/2010 | Iwashita et al. | 318/561 |
| 2010/0315030 | A1 | 12/2010 | Koenig | |

FOREIGN PATENT DOCUMENTS

JP    2003018875    1/2003

* cited by examiner

*Primary Examiner* — Paul Ip
(74) *Attorney, Agent, or Firm* — Miller, Matthias & Hull

(57) ABSTRACT

A method of controlling speed of an electric machine having a rotor and a stator is provided. The method may comprise the steps of monitoring a desired speed and a measured speed of the rotor, generating a torque command based on the desired speed and the measured speed, and controlling phase current to the stator based on a hybrid closed loop analysis of the torque command, the measured speed and an estimated position of the rotor. The estimated rotor position may be derived at least partially from the desired speed.

20 Claims, 3 Drawing Sheets

HYBRID CLOSED LOOP SPEED CONTROL USING OPEN LOOK POSITION FOR ELECTRICAL MACHINES CONTROLS

TECHNICAL FIELD

The present disclosure relates generally to electric machines, and more particularly, to systems and methods for controlling the speed of electric machines.

BACKGROUND

An electric machine such as an electrical power generation system, genset, or the like, is generally used to convert one form of energy into another and may operate in a motoring mode to convert electrical power into mechanical or rotational power, or operate in a generating mode to convert mechanical or rotational power into electrical power. Among the various types of machines available for use with an electric drive assembly, switched reluctance (SR) machines have received great interest for being robust and cost-effective. While currently existing systems and methods for controlling such electric machines provide adequate control, there is still room for improvement.

In order to efficiently operate the electric drive of a machine, it is important to accurately monitor the speed and/or position of the rotor relative to the stator of the machine associated with the electric drive, not only at high speeds of operation but at zero or low speeds as well. Conventional electric drives which operate at such lower speeds of operation or often change its rotational direction thus detect the absolute position of the rotor by using a high resolution speed wheel that is coupled thereto and provided with a plurality of teeth that are detectable by some form of a proximity sensor. Based on the desired use or application, however, not all machines may be able to use such high resolution speed wheels, but rather, may be required to use a low resolution speed wheel with much fewer teeth provided thereabout.

Use of such low resolution speed wheels makes it difficult for the electric drive system to accurately determine the absolute rotor speed or position and produce sufficient torque, especially while operating at zero or low speeds, such as during engine start routines. In some such designs, an initial rotor position is calculated at zero or close to zero speeds, from which further calculations and sensor feedback are relied upon to track absolute rotor position during operation of the machine. However, due to the low resolution of the speed wheels being used and limitations associated with the sensors, the initial rotor position calculations may be inaccurate. As the integrity of the tracking and overall control of the machine relies on the accuracy of the initial rotor position, any offsets caused by an inaccurate initial rotor position reading may be left uncorrected, which can further cause poor machine performance or prevent operation of the machine altogether.

Accordingly, there is a need to provide simple and more reliable means to control the operating speed of electric machines having lower resolution speed wheels. The disclosed systems and methods are directed at addressing one or more of the needs set forth above and overcoming the deficiencies of the prior art.

SUMMARY OF THE DISCLOSURE

In one aspect of the present disclosure, a method of controlling speed of an electric machine having a rotor and a stator is provided. The method may comprise the steps of monitoring a desired speed and a measured speed of the rotor, generating a torque command based on the desired speed and the measured speed, and controlling phase current to the stator based on a hybrid closed loop analysis of the torque command, the measured speed and an estimated position of the rotor. The estimated rotor position may be derived at least partially from the desired speed.

In another aspect of the present disclosure, a method of controlling speed of an electric machine having a rotor and a stator is provided. The method may comprise the steps of monitoring a desired speed and a measured speed of the rotor, generating a torque command based on the desired speed and the measured speed, determining an estimated position of the rotor based at least partially on the desired speed, and determining current control parameters for controlling a phase current to each phase of the stator based on a hybrid closed loop analysis of the torque command, the measured speed and the estimated position of the rotor.

In yet another aspect of the present disclosure, a control system for controlling speed of an electric machine having a rotor and a stator is provided. The control system may include a converter circuit operatively coupled to the stator, and a controller in communication with each of the stator and the converter circuit. The converter circuit may include a plurality of switches selectively communicating current with each phase of the stator. The controller may be configured to generate a torque command based on a difference between a desired speed and a measured speed, and control the switches based on a hybrid closed loop analysis of the torque command, the measured speed and an estimated position of the rotor. The estimated rotor position may be derived at least partially from the desired speed.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
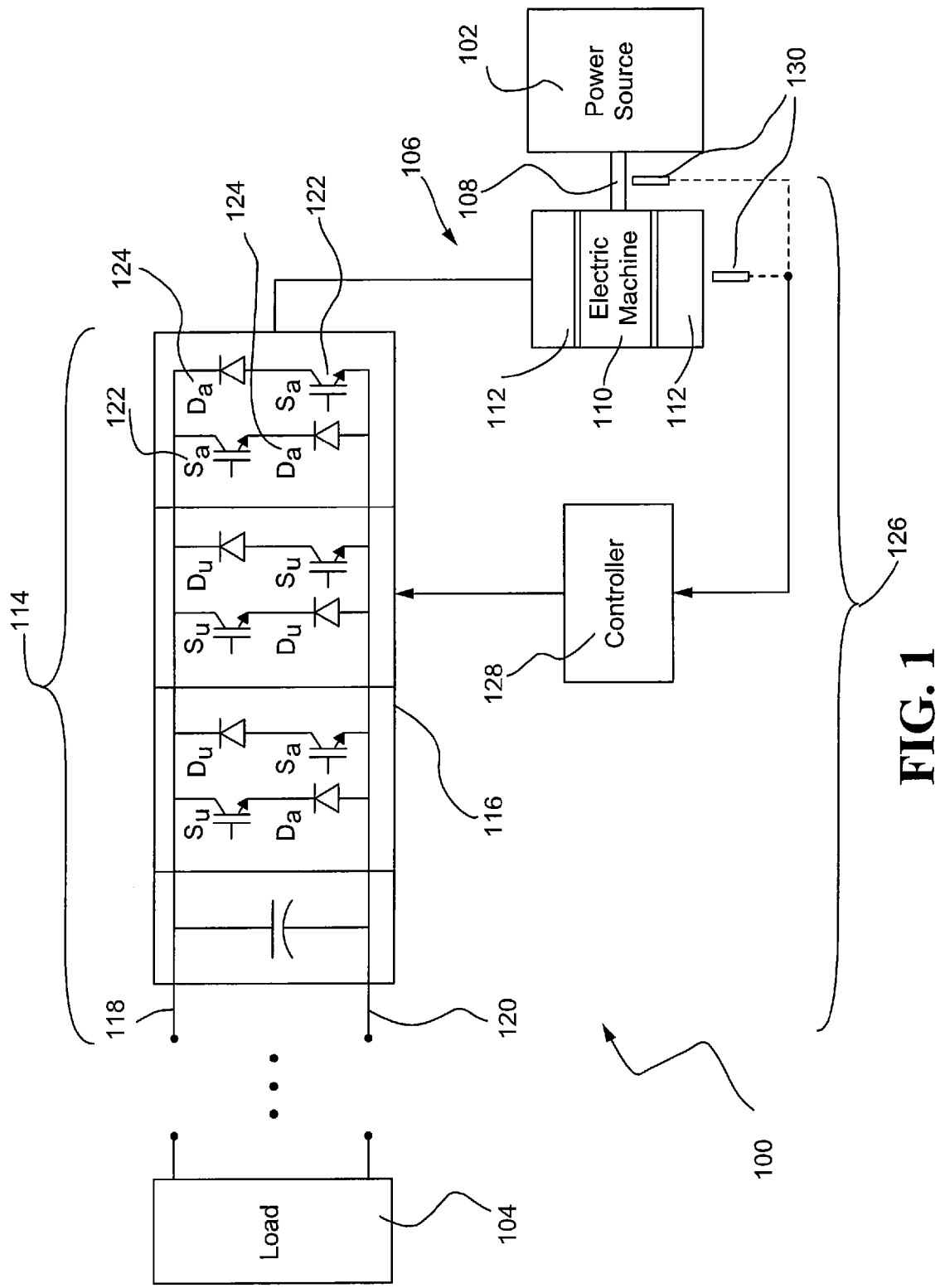
FIG. 1 is a schematic view of an exemplary embodiment of a speed control system as applied to an electric drive of an electric machine.

FIG. 1 schematically illustrates an exemplary electric drive 100 that may be employed to communicate power between a power source 102 and one or more electrical loads 104. The power source 102 may include, for example, a diesel engine, a gasoline engine, a natural gas engine, or any other source of energy commonly used with mobile machines. The power source 102 may also be used in conjunction with stationary applications and include, for instance, windmills, hydro-electric dams, batteries, fuel cells, or any other suitable source of energy. The load 104 may include one or more devices or components which receive electrical power. For example, with respect to industrial work machines or mobile work vehicles, the load 104 may include one or more motors for operating tools of the machine and/or one or more traction motors for causing motion of the vehicle.

The power source 102 of FIG. 1 may be configured to mechanically transmit power to an electric machine 106 of the electric drive 100 via a coupling 108, such as an axially rotating drive shaft, or the like. The electric machine 106 may include any suitable machine configured to generate electrical energy in response to an externally supplied mechanical input, or alternatively, source mechanical energy in response to electrically supplied input. In the particular embodiment of FIG. 1, for example, the electric machine 106 may include a switched reluctance (SR) machine, or the like, configured to produce electrical power in response to rotational input from the power source 102 and through the coupling 108, or alternatively, mechanically rotate the coupling 108 and turn or start the power source 102 in response to electrical current sourced thereto.

As is well known in the art, the machine 106 may include a rotor 110 that is rotatably disposed within a fixed stator 112. The rotor 110 of the machine 106 may be rotatably coupled to an output of the power source 102 via the coupling 108, or in other embodiments, via a direct crankshaft, a gear train, a hydraulic circuit, or the like. The stator 112 of the machine 106 may be electrically coupled to a common bus 114 of the electric drive 100 via a converter circuit 116. During a generating mode of operation, as the rotor 110 of the machine 106 is rotated within the stator 112 by the power source 102, electrical current may be induced within the stator 112 and supplied to the converter circuit 116. The converter circuit 116 may in turn convert the electrical signals into the appropriate direct current (DC) voltage for distribution to the electrical load 104 and/or any other device via the common bus 114. The common bus 114 may generally provide a positive line 118 and a negative or ground line 120 across which the common bus 114 may communicate a common DC bus voltage between one or more electrically parallel devices of the electric drive assembly 100. Alternatively, during a motoring mode of operation, the machine 106 may be enabled to cause rotation of the rotor 110 in response to electrical signals that are provided to the stator 112 from the common bus 114.

The converter circuit 116 may include a series of transistors or gated switches 122 and diodes 124 for selectively enabling one or more phase windings of the machine 106. A three-phase switched reluctance machine 106, for example, may be driven using a converter circuit 116 with six switches 122 and six diodes 124 for selectively enabling or disabling phase current through each of the three phases of the machine 106. Each of the switches 122 may further be enabled or disabled via gate signals while an external or secondary power source (not shown) may provide power across the positive and negative lines 118, 120 of the common bus 114 to force current through the respectively enabled switches 122 and diodes 124. Moreover, initial power to the converter circuit 116 and the machine 106 may be supplied by a secondary power source taking the form of, for example, a battery, residual voltage stored in a capacitor of the common bus 114, or any other suitable DC power supply.

Still referring to FIG. 1, the electric drive 100 may also be provided with a speed control system 126 configured to at least control the rotational speed and/or position of the rotor 110 relative to the stator 112 of the machine 106. The control system 126 may include a controller 128 that is configured to communicate with the machine 106 through the converter circuit 116 and one or more sensors 130. The controller 128 may be implemented using one or more of a processor, a microprocessor, a microcontroller, a digital signal processor (DSP), a field-programmable gate array (FPGA), an electronic control module (ECM), an electronic control unit (ECU), or any other suitable means for controlling the control system 126. The controller 128 may be configured to operate according to a predetermined or preprogrammed algorithm or set of instructions for operating the electric drive 100 based on the speed or position of the rotor 110 and the overall operating conditions of the electric drive assembly 100. Such an algorithm or set of instructions may be preprogrammed or incorporated into a memory that is on-board or external but accessible to the controller 128 as is commonly held in the art.

The sensors 130 may include an optical sensor, a Hall effect sensor, a variable reluctance sensor, an anisotropic magnetoresistance sensor, a proximity sensor, or any other suitable device adapted to electronically communicate the speed and/or position of the machine 106 to the controller 128. More specifically, the sensors 130 may be disposed in close proximity to a speed wheel of the rotor 110 of the machine 106 so as to detect the absolute position of the rotor 110 of the machine 106. The speed wheel may be incorporated into the body of the rotor 110, or externally but rigidly coupled to the rotor 110 or a coupling 108 thereof so as to rotate in direct correspondence with the rotor 110. The speed wheel may include a plurality of teeth disposed thereabout such that as the speed wheel rotates, the teeth interact with the sensor 130 and, for example, cause the sensor 130 to generate a signal having detectable rising and falling edges corresponding to the passing of each teeth.

In addition, the speed wheel may be incorporated as a low resolution speed wheel having, for instance, approximately 8 teeth thereabout configured to cause the sensor 130 to output an electrical sensor feedback signal with approximately 16 distinguishable rising and falling edges per revolution of the speed wheel and thus the rotor 110. The speed wheel may alternatively be provided as a high resolution speed wheel, for instance, having approximately 96 teeth configured to cause the sensor 130 to output an electrical sensor feedback signal with approximately 192 distinct rising and falling edges per revolution of the rotor 110. By monitoring the number of rising and/or falling edges in the sensor feedback signals, the controller 128 of FIG. 1 may be able to assess the immediate speed and/or position of the rotor 110 relative to the stator 112 any time during operation of the machine 106. Furthermore, based on the assessed rotor speed and/or rotor position, the controller 128 may be able to provide gate signals, or current control parameters, for operating the switches 122 of the converter circuit 116 and sourcing the appropriate current to each phase of the stator 112.

Figure 2:
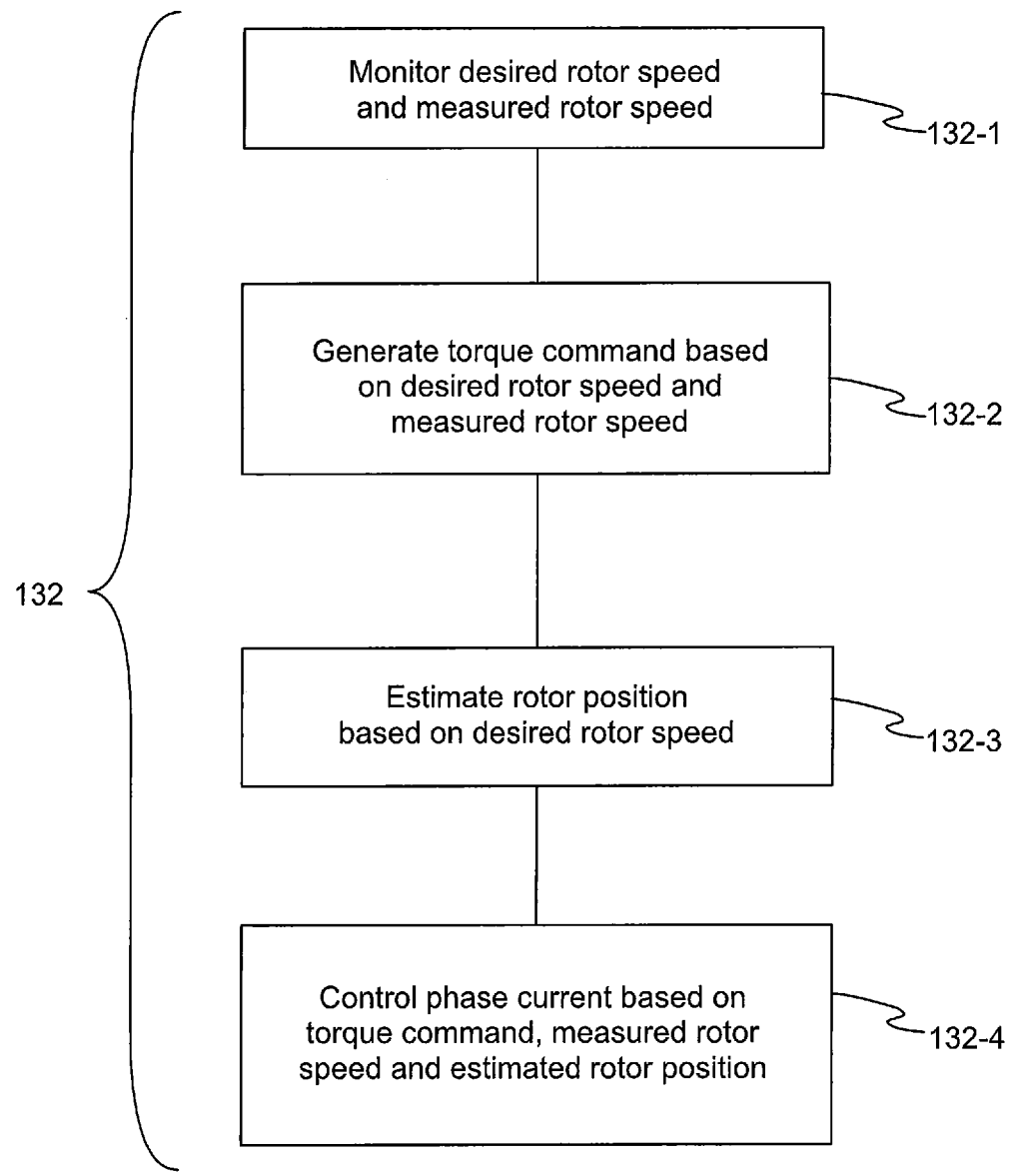
FIG. 2 is a flow diagram of a method of controlling an electric machine using a hybrid closed loop/open loop control scheme.

Turning now to FIG. 2, one exemplary algorithm or method 132 of controlling rotor speed is provided having a plurality of steps that may be selectively performed by the controller 128. The method 132 shown, or at least some of steps thereof, may be applied during certain modes of machine operation involving, for example, directional changes and/or zero to low speed operations, such as during an engine start routine, or the like, where sensorless control schemes and/or high resolution speed wheels may be less practical. Specifically, the controller 128 may be configured to perform the method 132 while the machine 106 is operating in a speed control mode, or the like, for example, to cause an associated combustion engine 102 to rotate to a speed enabling the engine 102 to start and maintain speed on its own. Once the engine 102 has been started and at the end of the engine start routine, the speed control mode may be disabled and the machine 106 may be controlled via a voltage control mode, or the like. Other control configurations and modifications will be understood by those skilled in the art without departing from the scope of the present disclosure.

Figure 3:
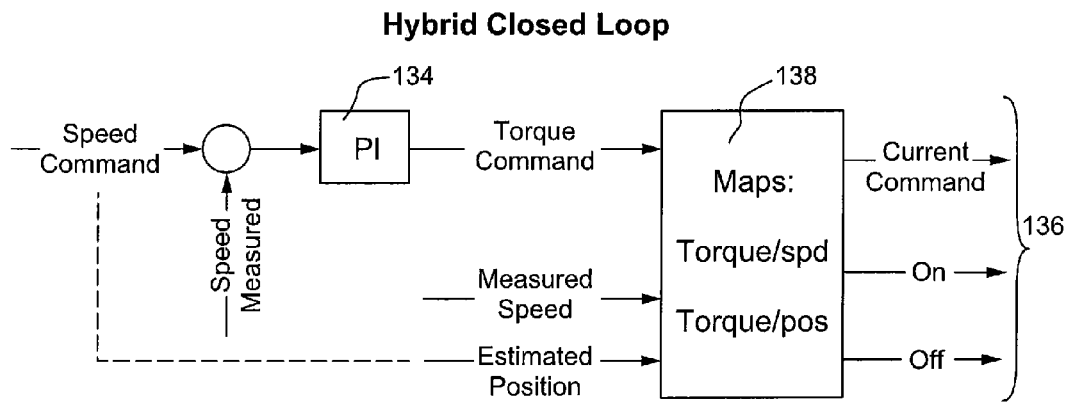
FIG. 3 is a schematic view of a hybrid closed loop control scheme for controlling phase current of an electric machine.
Figure 4:
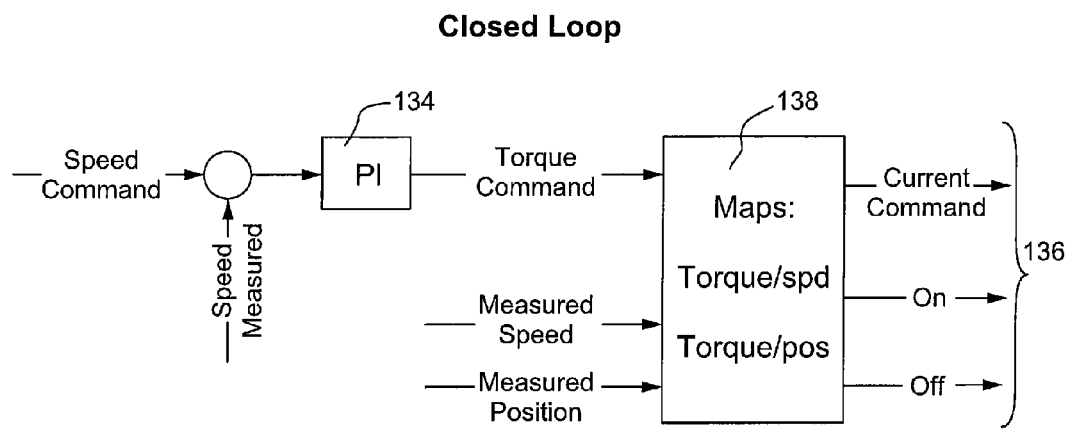
FIG. 4 is a schematic view of a closed loop control scheme for controlling phase current of an electric machine.

As shown by the method 132 of FIG. 2, the controller 128 may initially monitor the actual or measured rotor speed, as detected by the sensors 130 for instance, with reference to the speed command, or the desired rotor speed in step 132-1. Based on a detected difference between the desired rotor speed and the measured rotor speed, the controller 128 may be configured to generate a torque command in step 132-2. As shown in FIGS. 3 and 4, for example, the controller 128 may employ a proportional-integral (PI) controller 134 to generate and/or adjust the torque command according to detected differences between desired and measured rotor speeds. By employing the PI controller 134 in a speed control mode with the desired speed and the measured speed as inputs thereto, the amount of torque applied to the machine 106 may be controlled by specific machine parameters. For instance, the controller 128 may be able to control the machine 106 according to the duration of time that each phase of the stator 112 is energized and the magnitude of current with which each phase is energized. In essence, a greater difference between the desired speed and the measured speed may cause a particular phase to be energized for a longer duration and with a greater amount of current. As these machine parameters increase, the rotor 110 of the machine 106 may be caused to rotate and align to the energized phase faster and thus become increasingly more capable of overcoming any resistive torque or torque preventing the rotor 110 from rotating which may be caused by engine compression, or the like.

Upon determining a torque command in step 132-2, the controller 128 may be configured to proceed to control the phase current using a hybrid closed loop, or partially open loop, approach as shown for example in FIG. 3. In contrast to the fully closed loop approach of FIG. 4, for example, the hybrid closed loop analysis may rely on a rotor position that is estimated, via open loop, rather than measured through sensors 130, via closed loop, to control the phase current to the machine 106. More specifically, the hybrid closed loop approach may internally obtain the rotor position through calculations of the given desired speed or speed command input so as not to limit machine performance to any deficiencies in speed wheel resolution and/or sensor inaccuracies. As discussed with reference to the prior art, certain limitations of a fully closed loop approach may lack the accuracy and reliability needed to correctly identify an initial rotor position and provide acceptable machine performance. Although providing a high resolution speed wheel to the machine 106 may improve accuracy and performance, the implementation of such high resolution speed wheels may not always be desirable due to size constraints, packaging limitations, cost restrictions, and/or other factors. Thus, by controlling the machine 106 based on the speed command rather than solely on sensor feedback, the controller 128 may be able to provide more reliable performance in machines 106 which often operate in zero to low speeds or undergo direction changes.

Referring back to FIG. 2, the controller 128 may be configured to control the current to each phase of the stator 112 based on the hybrid closed loop approach shown in FIG. 3. As shown in the method 132 of FIG. 2, the controller 128 may be configured to derive or calculate the estimated position of the rotor 110 relative to the stator 112 based at least partially on the desired speed or the speed command input in step 132-3. The estimated rotor position may be obtained using any one or more of a variety of different available schemes. For example, the controller 128 may be adapted to derive an estimation of the rotor position from a given speed command based on predefined relationships or equations programmed into a memory accessible that is to the controller 128. In other embodiments, the controller 128 may also be configured to refer to preprogrammed lookup tables and/or maps which generate or suggest an appropriate estimated rotor position for a given speed command. As the hybrid closed loop approach dynamically calculates rotor position based on a changing speed command, the rotor position may be varied and not fixed to any initial rotor position as discussed with reference to the closed loop approaches of the prior art. Moreover, as the machine 106 attempts to follow the estimated rotor position, offsets between the estimated rotor position and the actual rotor position may be reduced.

Once the estimated rotor position is obtained, the controller 128 may be configured to control the phase current based on the torque command, the measured rotor speed and the estimated rotor position in step 132-4 as shown in FIG. 2. More specifically, the controller 128 may at least partially employ the estimated rotor position to control the gates or switches 122 of a particular phase of the stator 112. By switching the phase current and electromagnetically energizing the poles of each phase the stator 112, the respective poles of the rotor 110 may be caused to align with the energized stator poles and thus rotate the rotor 110 of the machine 106. Thus, changes in the desired speed or speed command input may result in changes to the estimated rotor position, which is in effect used to control machine speed. For example, if the speed command, and thus the estimated rotor position, is changed at a reasonable rate, the actual rotor speed may adequately follow the desired speed.

As in the closed loop approach of FIG. 4, the hybrid closed loop approach of FIG. 3 may also refer to the lookup tables and/or maps 138 to determine the set of current control parameters 136 most appropriate for the given torque command, measured rotor speed and estimated rotor position. As shown, the current control parameters 136 generated by the controller 128 may include one or more of a current command signal, a theta-on angle, a theta-off angle, or any other signal for appropriately controlling the phase current and thus rotor speed of the machine 106. The maps 138 may include, for example, one or more of a torque-speed map, a torque-position map, and any other predefined set of associations between torque commands, rotor speeds, rotor positions and current control parameters 136.

INDUSTRIAL APPLICABILITY

In general, the foregoing disclosure finds utility in various applications relating to the control of electric machines. More specifically, the disclosed systems and methods may be used to provide more viable control of machines that are typically used in association with electric drive assemblies of industrial work vehicles, stationary power generation machines, mobile machines, and the like, which may often be operated at zero to low speeds and/or undergo direction changes. Furthermore, the disclosed hybrid closed loop speed control schemes and approaches may be applied to electric drive assemblies having switched reluctance (SR) machines in which high resolution speed wheels may be undesirable and/or inapplicable. By incorporating both a closed loop component, such as the measured rotor speed, and an open loop component, such as the estimated rotor position, the present disclosure may improve the reliability of the control of sensor-based machines with low resolution speed wheels.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of controlling speed of an electric machine having a rotor and a stator, comprising the steps of:
   monitoring a speed command and a measured speed of the rotor;
   generating a torque command based on the speed command and the measured speed; and
   controlling, at a controller, phase current to the stator based on a hybrid closed loop means of analyzing the torque command, the measured speed and an estimated position of the rotor, the estimated rotor position being derived at least partially from the speed command.

2. The method of claim 1, wherein the torque command is generated based on a difference between the speed command and the measured speed of the rotor.

3. The method of claim 1, wherein the torque command is controlled using a proportional-integral (PI) assessment of the speed command and the measured speed of the rotor.

4. The method of claim 1, wherein the speed command mode is applied during an engine start routine.

5. The method of claim 1, wherein the phase current is controlled by one or more of a current command, a theta-on angle and a theta-off angle.

6. The method of claim 5, wherein the current command, the theta-on angle and the theta-off angle are derived based on one or more predefined lookup maps.

7. The method of claim 6, wherein the lookup maps include one or more of a torque-speed map and a torque-position map.

8. The method of claim 1, wherein the electric machine is a switched reluctance (SR) machine.

9. A method of controlling speed of an electric machine having a rotor and a stator, comprising the steps of:
   monitoring a speed command and a measured speed of the rotor;
   generating a torque command based on the speed command and the measured speed;
   determining an estimated position of the rotor based at least partially on the speed command; and
   determining, at a controller, current control parameters for controlling a phase current to each phase of the stator based on a hybrid closed loop means of analyzing the torque command, the measured speed and the estimated position of the rotor.

10. The method of claim 9, wherein the torque command is generated based on a difference between the speed command and the measured speed of the rotor.

11. The method of claim 9, wherein the torque command is controlled using a proportional-integral (PI) assessment of the speed command and the measured speed of the rotor.

12. The method of claim 9, wherein the current control parameters are used to control the phase current to each phase of the stator during an engine start routine.

13. The method of claim 9, wherein the current control parameters include one or more of a current command, a theta-on angle and a theta-off angle, the theta-on angle and the theta-off angle being derived based on one or more predefined lookup maps, the maps including at least one of a torque-speed map and a torque-position map.

14. A control system for controlling speed of an electric machine having a rotor and a stator, comprising:
   a converter circuit operatively coupled to the stator, the converter circuit including a plurality of switches selectively communicating current with each phase of the stator; and
   a controller in communication with each of the stator and the converter circuit, the controller being configured to generate a torque command based on a difference between a speed command and a measured speed, and control the switches based on a hybrid closed loop means of analyzing of the torque command, the measured speed and an estimated position of the rotor, the estimated rotor position being derived at least partially from the speed command.

15. The control system of claim 14, wherein the controller is configured to control the torque command using a proportional-integral (PI) assessment of the speed command and the measured speed of the rotor.

16. The control system of claim 14, wherein the controller is configured to control the switches based on the torque command, the measured speed and the estimated rotor position in a speed control mode.

17. The control system of claim 16, wherein the speed control mode is applied during an engine start routine.

18. The control system of claim 14, wherein the controller controls the switches according to one or more of a current command, a theta-on angle and a theta-off angle.

19. The control system of claim 18, wherein the current command, the theta-on angle and the theta-off angle are derived based on one or more of a torque-speed lookup map and a torque-position lookup map preprogrammed into a memory of the controller.

20. The control system of claim 14, wherein the electric machine is a switched reluctance (SR) machine.

* * * * *

UNITED STATES PATENT AND TRADEMARK OFFICE
CERTIFICATE OF CORRECTION

| | | |
|---|---|---|
| PATENT NO. | : 8,901,869 B2 | Page 1 of 1 |
| APPLICATION NO. | : 13/562375 | |
| DATED | : December 2, 2014 | |
| INVENTOR(S) | : Wai et al. | |

It is certified that error appears in the above-identified patent and that said Letters Patent is hereby corrected as shown below:

Title Page, Column 1, Item 54 (Title), line 2, delete "LOOK" and insert -- LOOP --.

In the Specification

Column 1, line 2, delete "LOOK" and insert -- LOOP --.

Signed and Sealed this
Twenty-fourth Day of November, 2015

Michelle K. Lee
*Director of the United States Patent and Trademark Office*